No. 880,142. PATENTED FEB. 25, 1908.
S. W. HOLLAND.
SAP RECEPTACLE.
APPLICATION FILED JUNE 22, 1907.
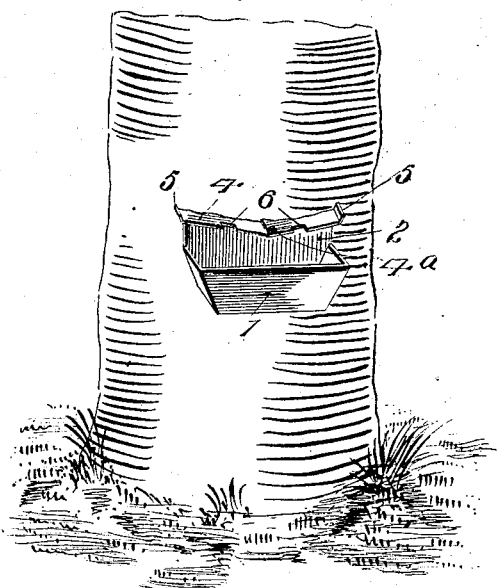
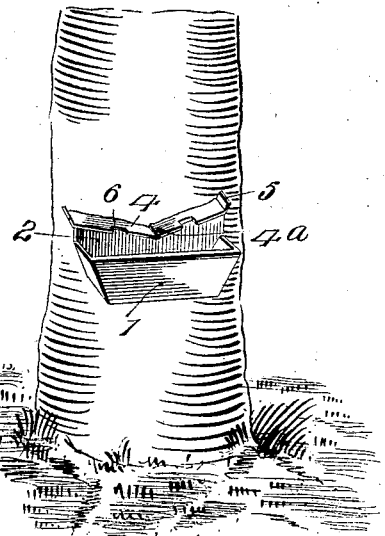
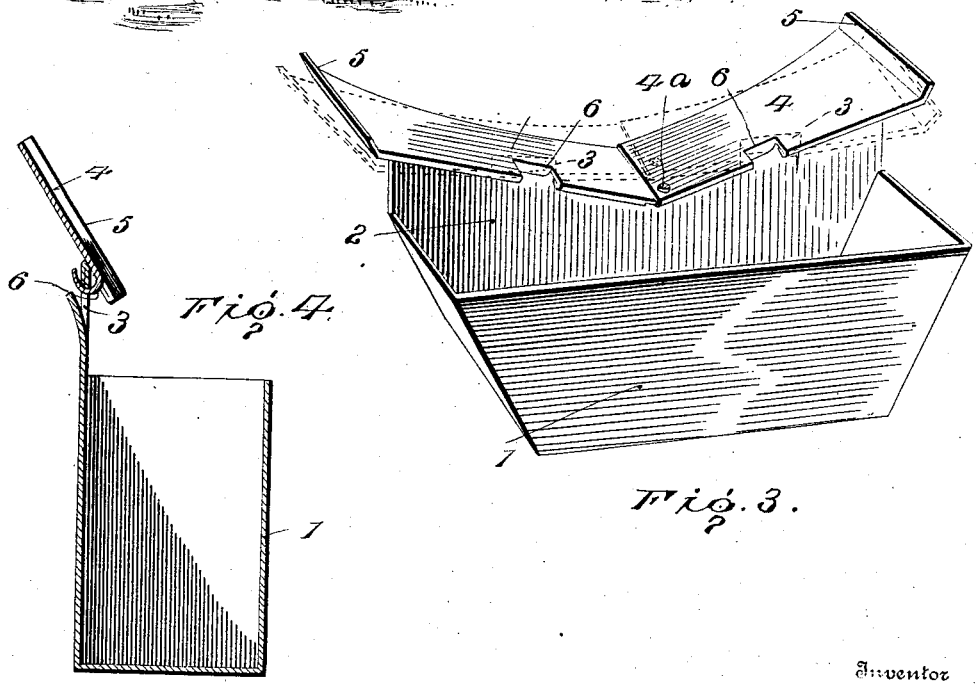
Witnesses
Inventor
S. W. Holland.
By
Attorney

UNITED STATES PATENT OFFICE.

SOLOMON W. HOLLAND, OF NEW ORLEANS, LOUISIANA.

SAP-RECEPTACLE.

No. 880,142.

Specification of Letters Patent.

Patented Feb. 25, 1908.

Application filed June 22, 1907. Serial No. 380,288.

*To all whom it may concern:*

Be it known that I, SOLOMON W. HOLLAND, of New Orleans, in the parish of Orleans and State of Louisiana, have invented certain new and useful Improvements in Sap-Receptacles; and I do hereby declare the following to be a full, clear, and exact description of the invention such as will enable others skilled in the art to which it appertains to make and use the same.

The primary object of this invention is to provide an apron or conductor for sap receptacles which will be applicable to trees of different sizes, and thereby render unnecessary the formation of deep incisions in small trees.

A further object is to render the cup immovable by accidental agencies.

The invention will be hereinafter fully set forth and particularly pointed out in the claims.

In the accompanying drawings, Figures 1 and 2 are views showing portions of two trees with the sap receptacle secured thereto. Fig. 3 is an enlarged view of the receptacle and apron, the apron sections being shown in different positions in dotted lines. Fig. 4 is a transverse sectional view.

Referring to the drawings, 1 designates the cup or receptacle of known construction, with the exception that its rear wall 2 is extended upwardly above the edges of the remaining walls and is provided with two slots 3, preferably formed by striking out the metal at points equidistant from the ends.

4 designates the apron or conductor which is formed in two separate sections designed to overlap at their inner or meeting ends. The two sections may be pivoted together at their overlapping edges by a removable pin or small bolt, 4ª, to hold the apron sections firmly together while being forced into the incision, and if desired the pin or bolt may then be removed. At their outer ends these sections are flanged upwardly as at 5, and from each section extends a hook 6, preferably formed by being struck up from the metal, each hook being bent backwardly under its respective section. These hooks are intended to take in the slots 3, and are narrower than such slots so as to permit the apron sections to be adjusted longitudinally toward or away from each other. In this way the apron may be readily attached to trees of different sizes, that is to say, the same apron may be used for both large and small trees, it being unnecessary to make deep incisions in affixing the apron to the smaller trees.

Another advantage arising from making the apron in separate sections and providing for the adjustable connection between the apron and the cup is that time is saved in making the incisions, which latter do not have to be made with the same degree of nicety as has heretofore been necessary with aprons formed in one piece. Furthermore, by attaching the cup to each of the sections it is held as against all accidental displacement, either by the wind or by animals rubbing against it.

I claim as my invention:

A sap receptacle having its rear wall formed with longitudinal slots, an apron composed of two corresponding sections overlapping at their inner meeting ends, each section having a hook extending from its underside for taking in the slots of the cup, said hooks being of less width than the slots to permit the apron sections to be adjusted relatively to each other.

In testimony whereof, I have signed this specification in the presence of two subscribing witnesses.

SOLOMON W. HOLLAND.

Witnesses:
GEORGE L. MOUNT,
WILLIE O. McLEMORE.